United States Patent

[11] 3,542,491

| [72] | Inventor | Joseph W. Newman<br>3062 Pickell Drive, Mobile, Alabama 36605 |
|---|---|---|
| [21] | Appl. No. | 830,209 |
| [22] | Filed | May 27, 1969<br>Continuation-in-part of Ser. No. 695,036, Jan. 2, 1968, abandoned. |
| [45] | Patented | Nov. 24, 1970 |

[54] FLUID PUMP
20 Claims, 23 Drawing Figs.

[52] U.S. Cl. ............................................. 417/275,
417/413, 417/477, 417/44, 417/223, 417/214;
92/13.2
[51] Int. Cl. ............................................. F04b 43/08
[50] Field of Search .......................................... 103/150,
149; 230/168, 170; 91/57

[56] References Cited
UNITED STATES PATENTS

| 453,277 | 6/1891 | Nickerson et al. | 103/149 |
| 664,507 | 12/1900 | Singer | 230/168 |
| 1,765,360 | 6/1930 | Baumann | 103/149 |
| 2,987,004 | 6/1961 | Murray | 103/149 |
| 3,105,447 | 10/1963 | Ruppert | 103/149 |
| 3,180,272 | 4/1965 | Broadfoot | 103/149 |
| 3,250,225 | 5/1966 | Taplin | 103/150 |
| 3,285,191 | 11/1966 | Taplin | 103/150 |
| 3,335,670 | 8/1967 | Williams | 103/149 |

FOREIGN PATENTS

| 669,809 | 4/1952 | Great Britain | 103/149 |
| 1,380,460 | 10/1964 | France | 103/149 |

*Primary Examiner*—Mark M. Newman
*Assistant Examiner*—Wilbur J. Goodlin
*Attorney*—Birch, Swindler, McKie and Beckett

ABSTRACT: A fluid pump having a deformable chamber which can be expanded and contracted to pump the fluid wherein the chamber is contained in a housing maintained under a high degree of vacuum. The vacuum permits the chamber to expand rapidly on the intake cycle since it does not have to act against the restraint of air pressure, thus permitting higher operating speeds and resultant increases in capacity. The chamber is enclosed in a retainer which prevents the tube from bursting under high pressure. When the chamber is in the shape of a tube, the tube is provided with inwardly projecting shoulders on the inside thereof to prevent the tube from being overstressed as it is deformed.

Patented Nov. 24, 1970

3,542,491

INVENTOR
JOSEPH W. NEWMAN

BY *Irons, Birch, Swindler & McKie*

ATTORNEYS

INVENTOR
JOSEPH W. NEWMAN

ATTORNEYS

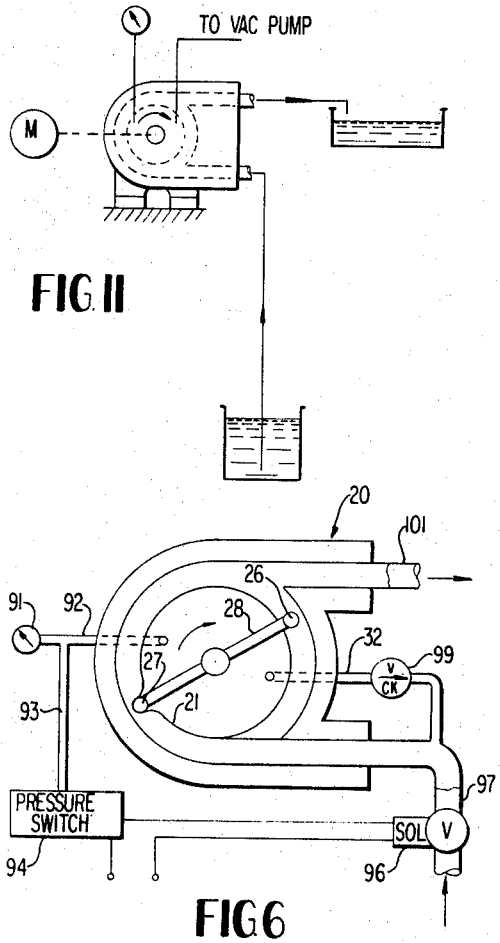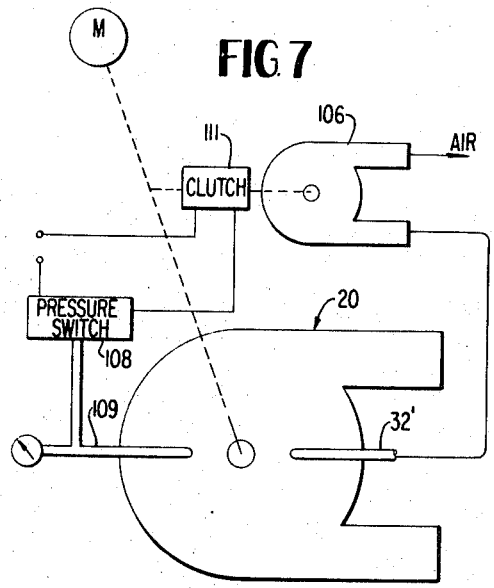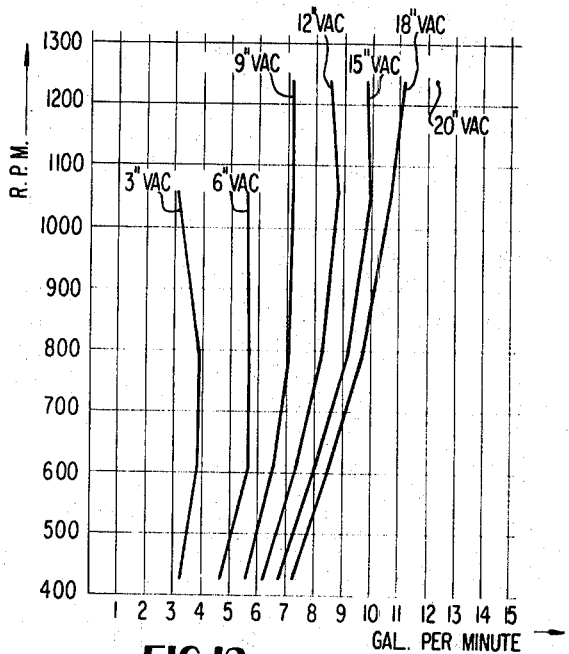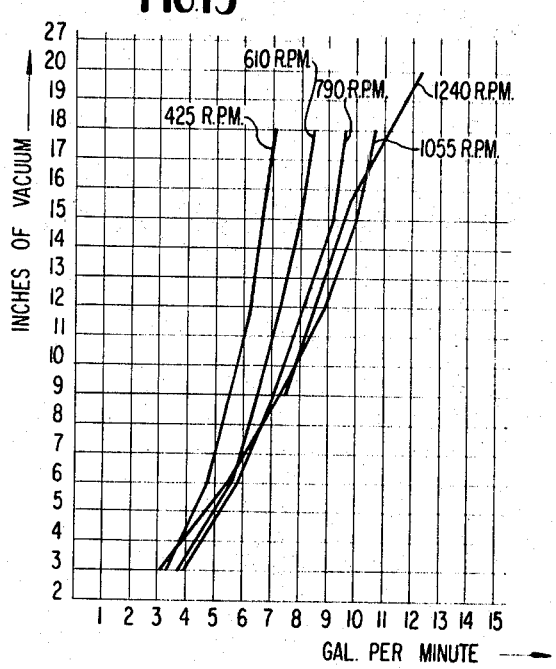

Patented Nov. 24, 1970

INVENTOR
JOSEPH W. NEWMAN

BY Irons, Birch, Swindler & McKee

ATTORNEYS

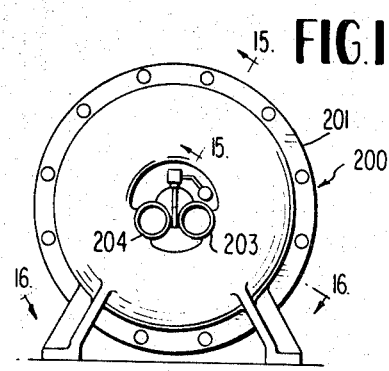
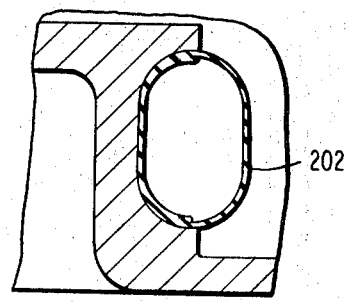
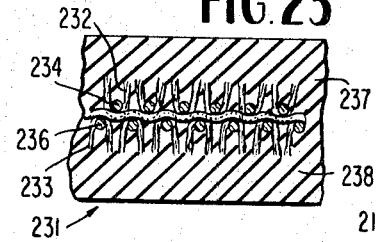
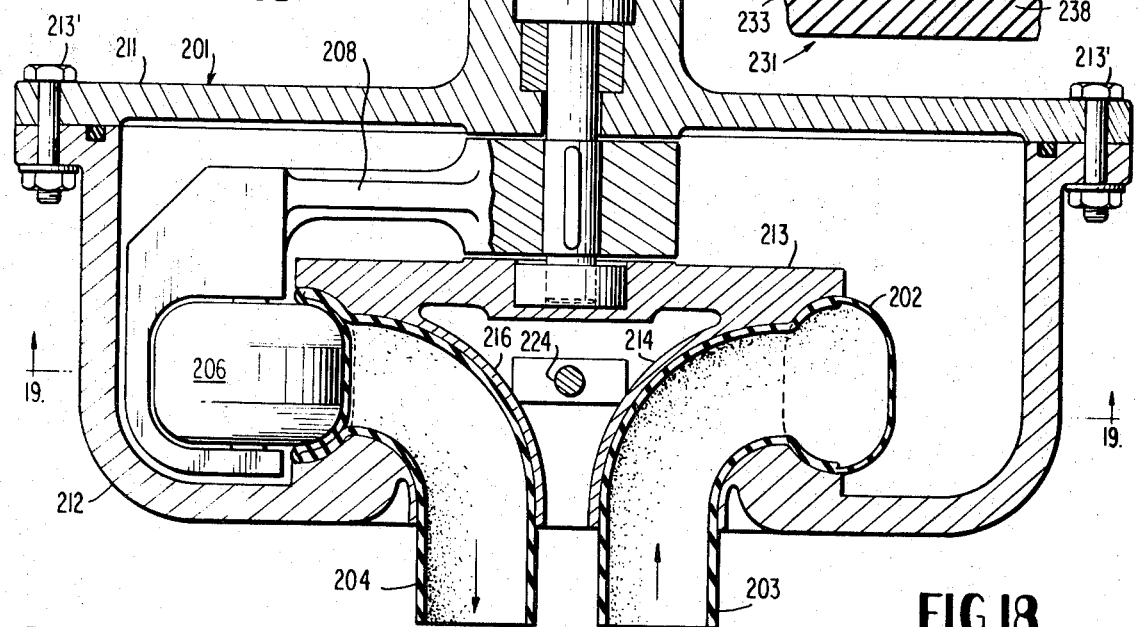
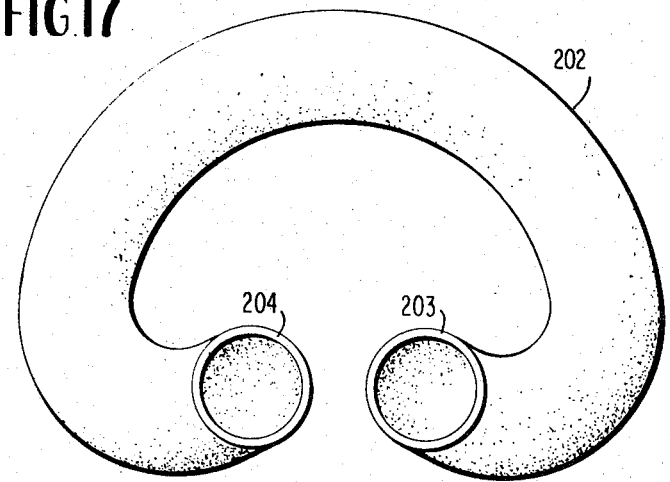
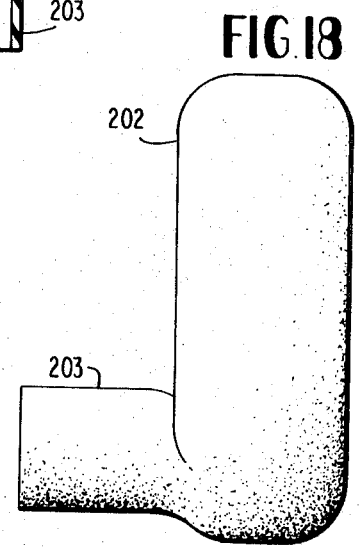

3,542,491

1

FLUID PUMP

CROSS-REFERENCE TO RELATED APPLICATION

This application is a continuation-in-part of U.S. Pat. application Ser. No. 695,036, filed on Jan. 2, 1968 in the name of Joseph W. Newman, now abandoned.

BACKGROUND OF THE INVENTION

Pumps generally fall into the three major classifications of reciprocating, centrifugal, and rotary pumps. The reciprocating pumps have the advantage that they are self-priming, have relatively high efficiency at low speeds, and can deliver a constant capacity against widely varying heads. However, reciprocating pumps have the disadvantage that their delivery is a pulsating flow, they have numerous moving parts, have a high initial cost and provide a relatively low volume of flow.

Centrifugal pumps are widely used throughout industry for pumping fluid by reason of their simplicity, low cost and their constant, high volume of output. However, centrifugal pumps suffer from their inability to acquire a strong vacuum and their inability to deliver a constant output against widely varying heads. Also, they are not self-priming and, due to the lack of interchangeability of their parts, maintenance costs are sometimes quite high.

On the other hand, rotary pumps are self-priming and have a relatively constant flow. They can also deliver a steady amount of output against widely varying heads and are rather easy to install and maintain. While rotary pumps are particularly adapted to handling liquids of high viscosities, they are not noted for their high output of liquids with low viscosities since their best results are obtained when the peripheral speed of the rotating member is comparatively slow. Also, rotary pumps are not well suited for handling liquids containing abrasive particles.

There is also a type of pump, which might be referred to as a flexible diaphragm, which can either be of the rotary or reciprocating type. The flexible diaphragm pumps alleviate many of the disadvantages of the other pumps, but in the past have been characterized by low efficiencies. Because of the nature of the diaphragm pumps, they are necessarily quite clean and require fewer highly machined parts than are required by other types of pumps.

In the flexible diaphragm pumps there is always the problem that the diaphragm will not fully distend before the next cycle; or that even if the diaphragm fully distends it will not have had sufficient time to refill with the fluid being pumped. Another drawback is the work which must be done just to compress the diaphragm, especially if it is made of heavy material. Of course, as you make the diaphragm of heavier more resilient material to get faster expansion and refilling thereof, the work which is consumed in compressing the diaphragm increases. A partial solution to this dilemma was suggested in the 1891 patent of Nickerson et al. U.S. Pat. No. 453,277. There it was broadly suggested that if the air in the housing surrounding the tube (diaphragm) is maintained at an attenuated level, lighter and larger tubes (diaphragms) can be used. Other patents broadly suggesting this concept are Singer U.S. Pat. No. 664,507, Broadfoot U.S. Pat. No. 3,180,272, and British patent No. 669,809.

However, when lighter diaphragms are employed in high vacuums and the pumping is against high pressure heads, the diaphragms will rupture due to the large differential pressure on the inside and outside of the diaphragm. Furthermore, if the diaphragm is made of thicker material, there is more of a tendency for the wall of the diaphragm to be overstressed during deformation, causing a breakdown in the molecular structure of the wall.

Accordingly, the primary object of this invention is an improved diaphragm type pump characterized by high efficiencies and at the same time combining the desirable features of reciprocating, centrifugal and rotary pumps.

It is a further object of the invention to provide a retainer device which prevents the diaphragm from rupturing under conditions of high vacuum and high pressure head.

Another object is to provide a diaphragm in the shape of a tube having a unique cross-sectional configuration to avoid overstressing of the tube during deformation.

A still further object of the invention is to provide a diaphragm made of supple material which offers little or no resistance during deformation and which rapidly assumes a distended configuration after each pumping cycle by reason of the high vacuum on the outside thereof.

Another object of the invention is to provide a rotary compress type of pump in which the flexible tube has a relatively large diameter and a small thickness.

SUMMARY

Generally described, the invention relates to a fluid pump which includes a deformable pumping chamber secured between an inlet and an outlet supplying and removing the fluid being pumped. The deformable pumping chamber is mounted inside a housing maintained at a high degree of vacuum sufficient to permit the deformable chamber substantially instantaneously to distend fully after each pumping cycle and prior to the next succeeding pumping cycle. Any one of several devices can be provided for repetitively deforming the pumping chamber to force fluid therein out through the outlet. The deformable pumping chamber is provided with a retainer which surrounds and constrains the chamber within limits. The retainer use of a very high vacuum without allowing the deformable chamber to overdistend by reason of the large differential pressure on the inside and outside of the chamber.

In the preferred embodiment of the invention means are also provided for continuously sensing the degree of vacuum inside the housing, and upon loss of vacuum to a predetermined point, energizing auxiliary vacuum-producing means for maintaining the requisite degree of vacuum in the housing. Also, the deformable pumping chamber is designed so that the molecular structure of the material from which the chamber is made is not overstressed while being compressed to force a substance from its interior. This design, with consideration given the molecular structure of the deformable pumping member, gives the chamber a functional life of indefinite time.

In another embodiment of the invention relating to a rotary compress type of pump, the compressing rollers are mounted radially outward of the deformable tube to press the tube inwardly. The entire housing is placed under a partial vacuum so that the inlet pressure urges the fluid into the tube after each pumping cycle and expands the tube into its nondeformed configuration.

DRAWINGS

Other objects, advantages, and aspects of the invention will become apparent by reference to the following detailed description of the invention and drawings of specific embodiments thereof, wherein:

FIG. 6 is a schematic view of the type of pump disclosed in FIG. 1 and showing control means for maintaining a predetermined degree of vacuum inside the housing;

FIG. 7 is a schematic view of a second embodiment of a control means for maintaining a predetermined degree of vacuum inside the housing;

3

Figure 1:
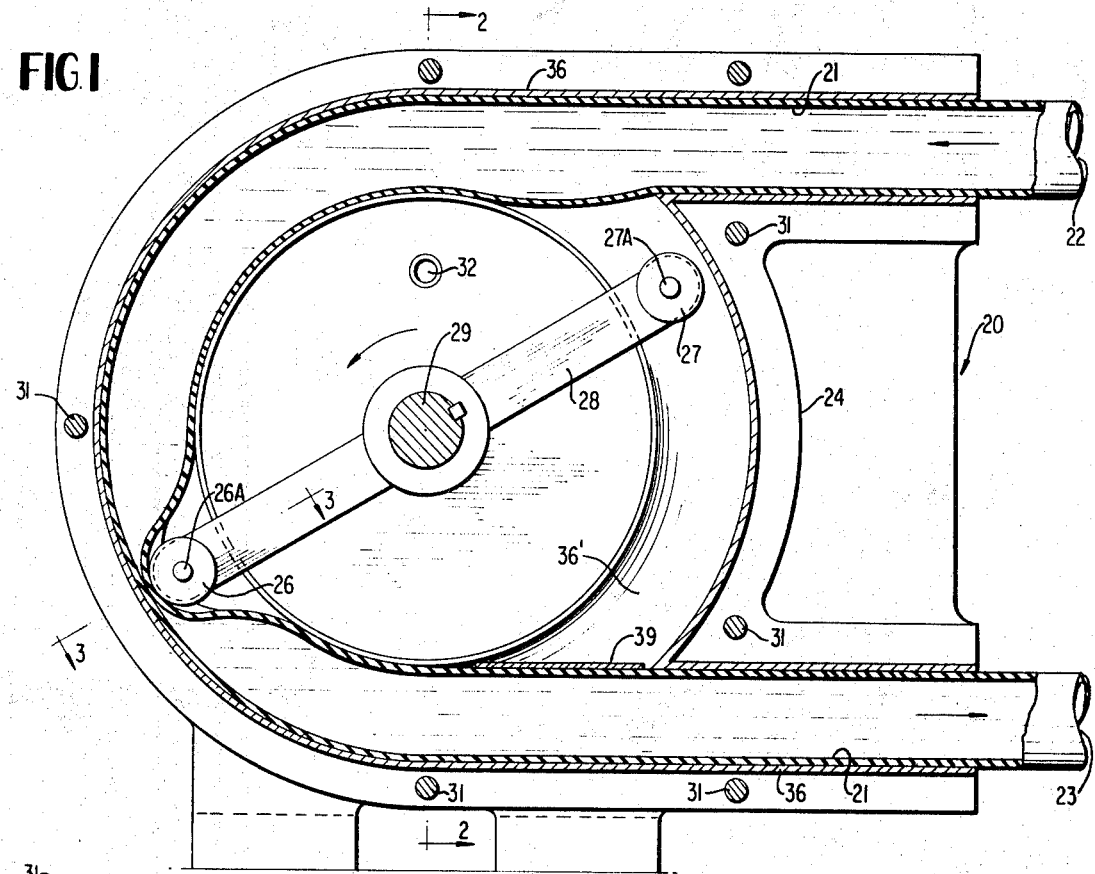
FIG. 1 is a cross-sectional view embodying the principles of the invention and showing a first type of deformable pumping chamber mounted inside a hermetically sealed housing.
Figure 9:
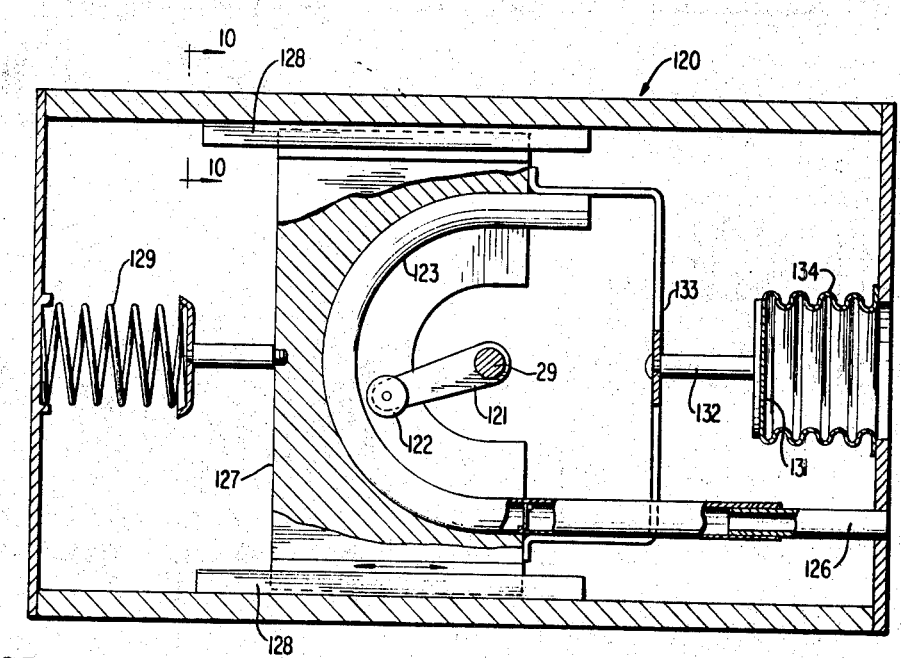
Figure 8:
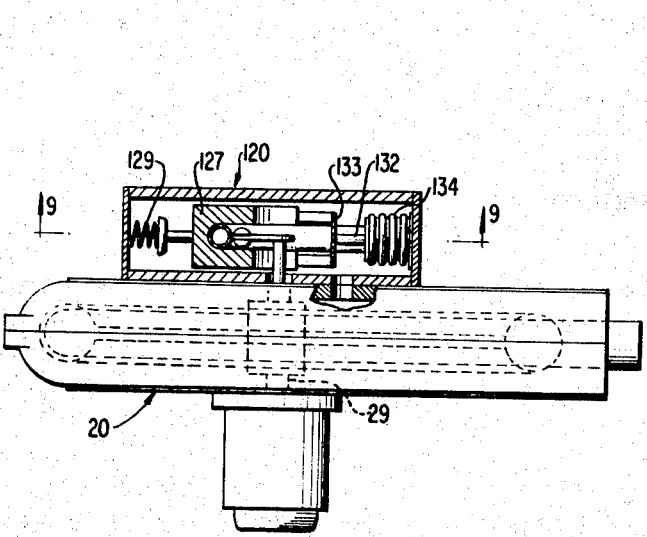
Figure 10:
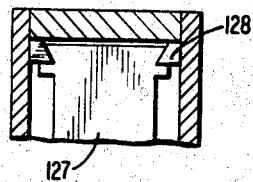
Figure 19:
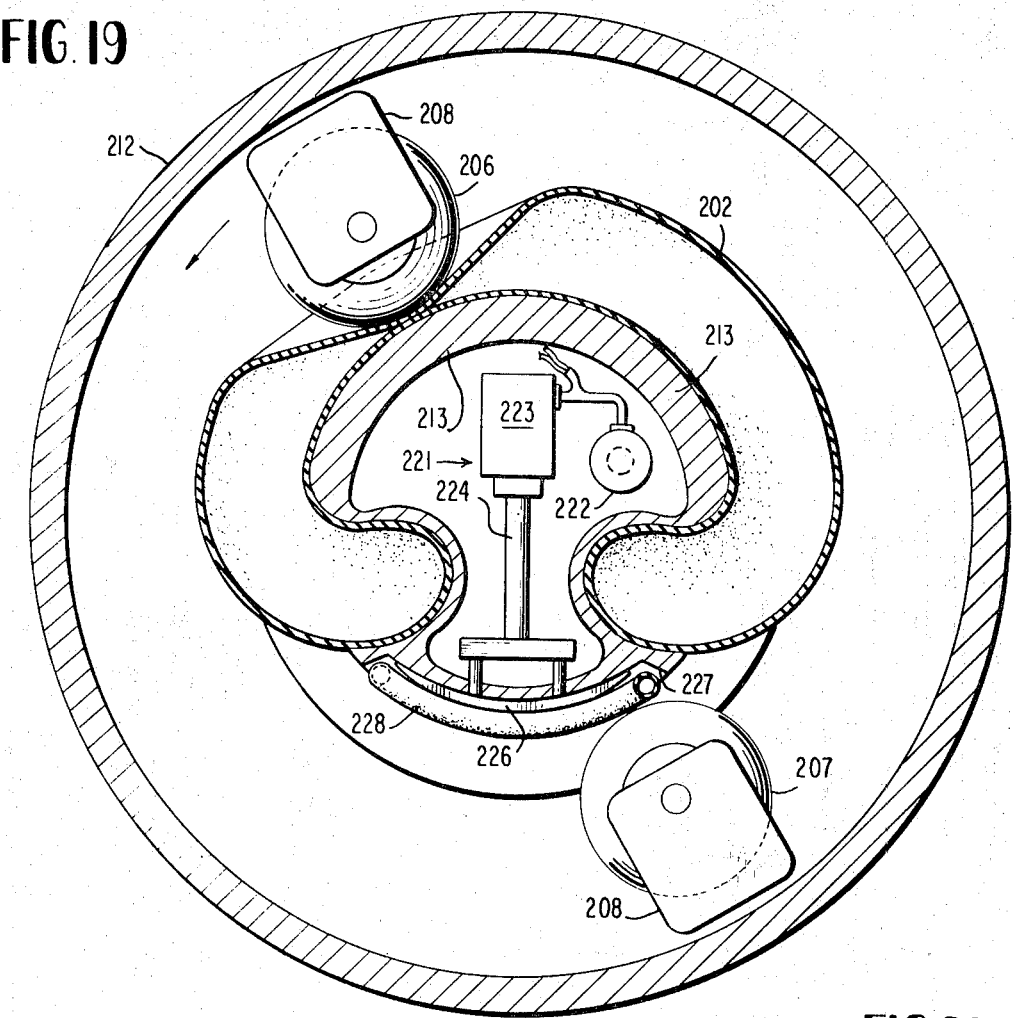
Figure 20:
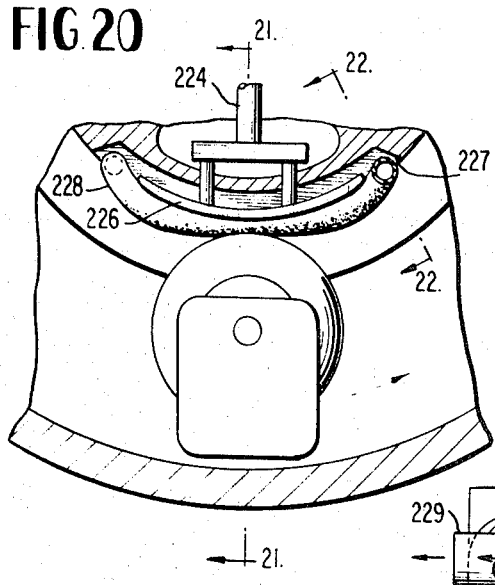
Figure 21:
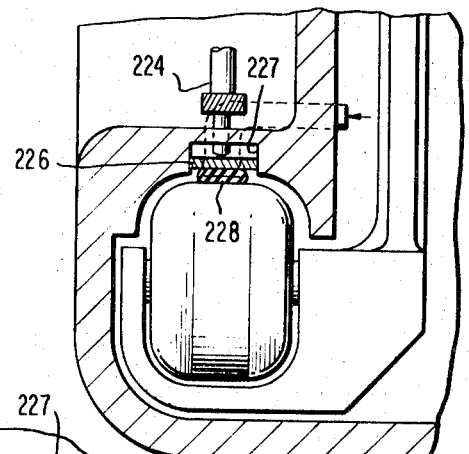
Figure 22:
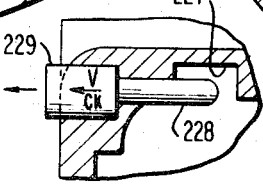

FIG. 8 is a plan view of a third embodiment of a control device for maintaining a predetermined degree of vacuum inside the housing;

FIG. 9 is a cross-sectional view taken along line 9-9 of FIG. 8 showing in detail a supplementary vacuum pump and the controls therefore; FIG. 10 is a cross-sectional view taken along line 10-10 of FIG. 9 showing a track for guiding the movement of the supplementary vacuum pump;

FIG. 11 is a schematic view of a simple testing pump of the type of pump disclosed in FIG. 1 employed to test pumping capability under varying operating conditions;

FIG. 12 is a graph showing the results of tests performed with the apparatus of FIG. 11 and comparing revolutions per minute to gallons pumped per minute with increasing degrees of vacuum inside the housing;

FIG. 13 shows the same data as FIG. 12 with inches of vacuum plotted against gallons per minute for various r.p.m. to illustrate the necessity of a quick recovery stroke for high volume output;

FIG. 14 shows a side elevation view of another embodiment of the pump;

FIG. 15 is a cross-sectional view taken along line 15-15 of FIG. 14 with portions removed;

FIG. 16 is a cross-sectional view of the pump taken along line 16-16 of FIG. 14;

FIG. 17 is a front elevational view of the compressible tube removed from the pump;

FIG. 18 is a side elevation view of FIG. 17;

FIG. 19 is a cross-sectional view of the pump taken along line 19-19 of FIG. 16 with the rollers in an advanced position;

FIG. 20 is a view similar of FIG. 19 with portions removed and with the roller in a different position showing in detail an apparatus for maintaining the vacuum in the housing;

FIG. 21 is a cross-sectional view taken along line 21-21 of FIG. 20;

FIG. 22 is a cross-sectional view taken along line 22-22 of FIG. 20; and

FIG. 23 is a cross-sectional view of an improved two-ply reinforced tube for use in the subject pump.

DETAILED DESCRIPTION OF THE INVENTION

In FIG. 1 there is shown a fluid pump generally denoted 20 which includes a flexible diaphragm or tube 21 arranged in a generally arcuate shape. The tube 21 has an inlet end 22 and an outlet end 23 and is mounted inside a housing 24 acting as a support for the tube. The fluid to be pumped is supplied to the inlet end of the tube 22 and is forced through the arcuate portion of the tube by a pair of rollers 26 and 27. The rollers 26 and 27 are mounted on a suitable rotatable arm 28 keyed to a drive shaft 29 driven by a motor (not shown). The arm 28 and the rollers 26 and 27 are rotated in a counterclockwise direction to successively and repetitively pump the fluid through the tube 21.

Figure 2:
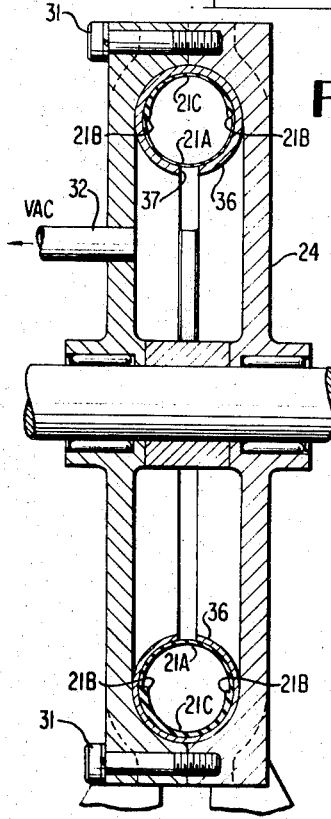
FIG. 2 is a cross-sectional view taken along line 2-2 of FIG. 1 and showing the pumping chamber positioned inside a retainer tube.

As shown in FIG. 2, the housing 24 is formed in two sections and is held together in hermetically sealed relationship by bolts 31-31 spaced around the periphery of the housing. A tap 32 communicates with the interior of the housing 24 and is connected at its other end to a vacuum-producing device, examples of which are shown in FIGS. 6 and 7 which will be discussed in greater detail hereinafter. The vacuum-producing device must have the capability of maintaining a high degree of vacuum inside the housing 24 so that there is a greatly reduced pressure exerted on the exterior of the tube 21. The requisite degree of vacuum provides several beneficial results, including higher efficiency and greatly increased capacity of the pump.

The most pronounced benefit derived by suitably evacuating the housing 24 is the provision of a large differential pressure on the inside and the outside of the tube 21 resulting in an essentially instantaneous intake of fluid immediately behind each of the rollers 26 and 27 as they proceed through a pumping cycle. This results from the fact that the inlet pressure rapidly forces the fluid into the tube 21 with the greatly attenuated atmosphere inside the housing offering little or no resistance. Consequently, the pump can be operated at a substantially higher speed than was formerly possible where, in the intake cycle, the resiliency of the tube 21 principally was relied upon to expand the tube from its deformed condition.

For a given degree of vacuum within the housing 24 the capacity of the pump 20 depends upon the volume of the tube 21 between the point where the roller first engages the tube and the point where the roller disengages from the tube, and upon the speed of the driving arm 28. The speed at which the driving arm 28 can be rotated is primarily dependent upon the time which is necessary to refill the tube 21 with a supply of fluid. Assuming that the most desirable condition is to pump only after the tube 21 with a supply of fluid. Assuming that the most desirable condition is to pump only after the tube 21 has filled, it will be seen that the time required to fill the tube becomes a critical and controlling parameter. This time is determined primarily by the resiliency of the tube 21, which in turn depends upon the type of tube material and the thickness of the tube material, the inlet pressure on the fluid, the pressure on the interior of the housing 24 and, also, upon the viscosity of the fluid being pumped. If the pump is run at a speed which is faster than the time required to fill the tube 21, then pumping of an incompletely filled tube will result in a necessary diminution of output fluid, as well as an increase in turbulence and wasted energy.

By maintaining the requisite high degree of vacuum inside the housing 24 it is possible to use a much thinner walled tube 21 because the expansion of the tube 21 is not dependent upon its inherent resiliency, but instead is derived from the fact that there is a large differential pressure on the inside and the outside of the tube. Also, by reducing the thickness of the tube 21 it should be apparent that less energy is wasted in the compression of the tube 21 and correspondingly less heat is generated. Thus, not only does the thin walled tube increase the overall efficiency of the pump, but it permits its operation at a higher speed without reaching a critically high temperature.

Another important feature of tube 21 is that it may be designed with a cross section which avoids sharp bends in the tube during compression. In this manner it is possible to avoid the overstressing of the tube which in prior art vacuum pumps has been the primary cause of tube failures.

In the embodiment shown in FIGS. 1—4, the thickness of the tube 21 varies along its cross section in such a manner as to further reduce the stresses on the tube during compression. The inner half of the tube denoted as element 21A and which is the portion engaged by the rollers, is made of relatively thin material. This makes compression of the tube easier and requires less energy. At the middle of the cross section of the tube on each side, adjacent the point where the maximum bending of the tube wall occurs, is a relatively thick portion of tube material which forms shoulders 21B. From the shoulders 21B to the outward cross-sectional portion of the tube, the thickness of the tube gradually decreases until at 21C it is approximately the same thickness as the inner portion of the cross section 21A. The shoulders 21B cooperate with complementary, curved extensions 26A and 27A on the rollers 26 and 27, respectively, (FIGS. 1 and 3) to prevent extreme bending of the tube 21. Instead the tube forms a gradual bend with the shoulders 21B acting as cushions to prevent the tube from bending on too sharp a radius. This prevents the rapid breakdown of the molecular structure of the tube wall which commonly causes the tube to rupture.

In view of the differential pressure which exists on the wall of the tube 21, it is entirely feasible to employ a supple tube having no resiliency whatsoever, thus further reducing the energy required to compress the tube during a pumping cycle. The tube may be made of a pleated material which expands and contracts solely by reason of the differential pressure and the action of the rollers, respectively. The tube 21 also may be made of a nonresilient fabric overlay of such materials as polyesters, tetrafluoroethylene, polyamides, or glass fibers impregnated with an elastomeric sealant such as a synthetic rubber. Again, such a hose would offer very little resistance to compression and would be expanded solely by reason of the differential pressure exerted thereon. The vacuum which is required to return a supple tube to a distended shape after each pumping cycle will vary depending on the type of material used and the inlet pressure of the fluid being pumped. The degree of vacuum necessary can be readily determined by making trial runs and measuring the output at various degrees of vacuum.

As the thickness of the tube 21 is decreased and as the vacuum inside the housing 24 is increased, a point is reached at which the pressure on the inside of the tube becomes so great that it will cause the tube to over expand and rupture. This problem becomes more acute as the outlet head, against which the fluid is being pumped, is increased. Therefore, it has been found necessary to provide a retainer tube 36 (FIGS. 1—4) mounted on the interior of the housing 24, and which generally conforms to the curved surface thereof. The retainer tube 36 also has the same general interior shape as the exterior of the tube 21 so as to snugly surround the tube to constrain the tube in its expanded condition. The retainer tube 36 further includes a slot 37 which extends around the inner circumference thereof. The rollers 26 and 27 are positioned on the interior of the retainer tube 36, and the driving arm 28 rotates within the slot 37. The driving arm 28 and the slot 37 should be dimensioned so that there is no binding of the arm as it rotates, but there should be small enough clearance so that the tube 21 cannot enter the slot 37. The slot 37 also permits direct communication between the interior of the housing 24 and the exterior surface of the tube 21.

It should be appreciated that the retainer tube 36 fits snugly around the exposed surface of the tube 21, thus constraining and preventing its overexpansion. This permits the use of much lighter tubes having relatively a thin wall which offers less resistance during the pumping cycle. This results in a tube having greater inside volume for a given outside diameter which yields an increase in the capacity of the pump. Also, since less work is consumed in compressing the tube itself, an increase in the efficiency of the pump is obtained.

Figure 4:
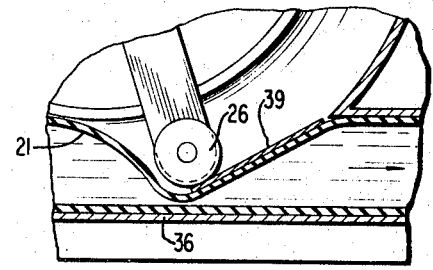
FIG. 4 is a view similar to FIG. 1 with portions removed showing the roller engaging a tube reinforcing member at the completion of a pumping cycle.

As shown in FIG. 4, a reinforcing member 39 may be secured to the outer periphery of the tube 21 at the point at which the rollers 26 and 27 lose contact with the tube 21 in their arcuate travel. This reinforcing member 39 is designed to prevent the tube from expanding into the area of the retainer ring, denoted in FIG. 1 by 36', with resulting tube rupture. The reinforcing member 39 can be made of any material which is strong in tension; or it could be a flexible band of articulated metal pieces, with or without a coating of resilient material over it.

It is useful in some circumstances to make the reinforcing member 39 in the form of a band (not shown) which extends along the entire surface of the tube 21 adjacent the slot 37 in the retainer tube 36. Such a band prevents the tube 21 from working its way through the slot 37 into the interior of the pump, and also increases the durability of the tube 21.

Alternatively, instead of the reinforcing member 39, a flap type of valve (not shown) may be provided which extends across substantially the same area as the reinforcing member 39. Such valve member is pivoted so as to permit the rollers 26 and 27 to continue their circular movement, and is biased in a direction toward the tube 21 so as to preclude the tube from overexpanding as the rollers 26 and 27 lose contact.

Figure 5:
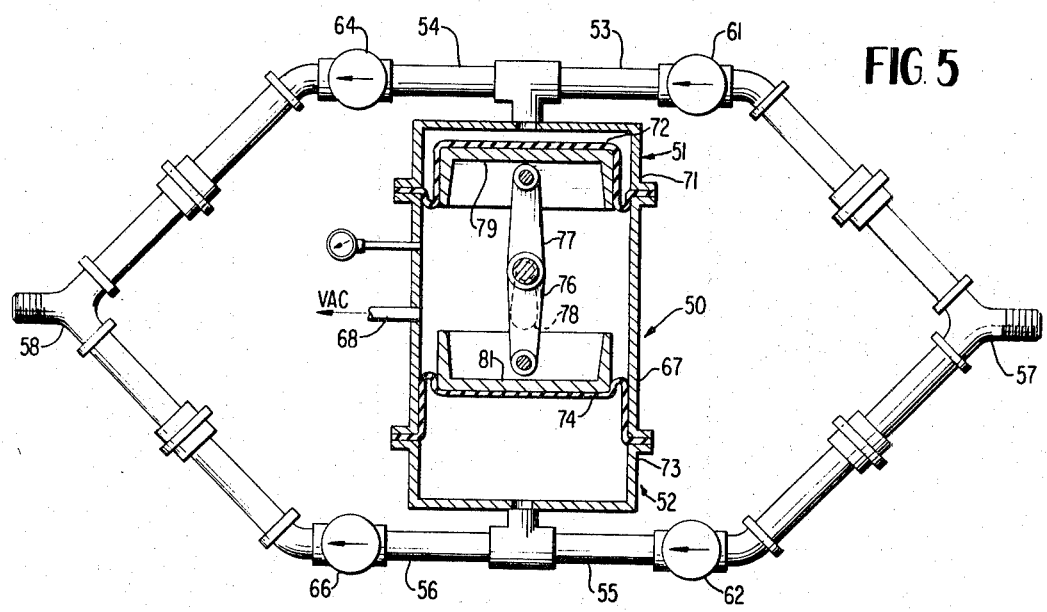
FIG. 5 is a side elevation view of a second embodiment of the invention disclosing a reciprocating, dual-acting pump mounted inside a hermetically sealed evacuatable housing.

Referring now to FIG. 5, there is shown as a second embodiment of the invention, a dual-acting, diaphragm type of fluid pump, denoted generally by the numeral 50. The pump 50 includes a first deformable pumping chamber 51 and a second pumping chamber 52 which are connected by respective sections of pipe 53 and 54, and 55 and 56 to a fluid inlet 57 and a fluid outlet 58. The sections of piping 53 and 55 have appropriate one-way check valves 61 and 62, respectively, which permit fluid to enter the pumping chambers on the intake cycle but which preclude passage of the fluid therethrough during a pumping cycle. Likewise, the outlet pipes 54 and 56 are provided with one-way check valves 64 and 66, respectively, which permit fluid to pass therethrough toward the outlet 58 on a pumping stroke, but which prevent passage of fluid from the outlet into the pumping chambers.

The pump 50, is enclosed in a hermetically-sealed housing 67 which is connected by a tap 68 to a vacuum line. The source of vacuum should be sufficient to maintain the housing at the requisite high degree of attenuation similar to the arrangement disclosed in FIG. 1.

The pumping chamber 51 comprises diaphragm rigid section 71 to which is connected a flexible diaphragm 72. The pumping chamber 52 is provided with a similar rigid section 73 and a flexible diaphragm 74. The diaphragms can be made of any appropriate material such as a neoprene and dacron, fabric of plastic, rubber, etc., or they can be made of non-resilient material such as heavy fabric, or they can be made of pleated material. The housing 67 not only serves to maintain the vacuum but also acts as a retaining means for the flexible diaphragms 72 and 74. In this way the housing 67 acts to constrain the deformable portions of the chambers 51 and 52 to prevent their overexpansion and possible rupture.

Mounted between the two flexible diaphragms 72 and 74 is an eccentric drive mechanism 76 for reciprocating crank arms 77 and 78, alternately. The arms 77 and 78 have connected thereto pivoted plates 79 and 81, respectively, which are effective during their movement into their respective flexible diaphragms to force substantially all the fluid from the chambers 51 and 52.

The housing 67 and the plates 79 and 81 act to retain the flexible diaphragms 72 and 74 and prevent their overexpansion, thus permitting the use of a high vacuum in the housing without rupturing the diaphragms. This also allows the use of thinner-walled diaphragms, which are more efficient.

The advantages of enclosing the diaphragm pump 50 in the vacuumized housing 67 are similar to those which were described with respect to the embodiment shown in FIGS. 1—4. More particularly, by providing a relatively large differential pressure on the inside and the outside of the flexible diaphragms 72 and 74, and the plates 79 and 81, immediately after each pumping stroke the pumping chambers 51 and 52 rapidly refill with the fluid by reason of the inlet pressure. In this manner it has been found that it is possible to operate such a pump at a much higher rate of speed thereby greatly increasing the capacity of the pump without varying any of the other dimensions or parameters of the pump.

An additional and very important factor, which contributes to the efficiency of the pump, is the fact that the flexible diaphragms 72 and 74, as they are expanding to refill, are not required to act against atmospheric pressure inside the housing 67. Instead, the flexible diaphragms are acting only against a very attenuated atmosphere which offers less resistance.

It is also possible to have the inlet pressure provide the entire energy for returning the flexible diaphragms 72 and 74 and their respective plates 79 and 81 on the suction cycle. In such a pump a cam drive (not shown) could be provided which alternately engaged the plates 79 and 81 to force the fluid out of the chambers 51 and 52 during the pumping cycle. The plates and diaphragms would be returned on the suction cycle solely by reason of the differential pressure acting thereon, namely the inlet pressure on one side and a high vacuum on the other side. This design eliminates numerous parts and greatly simplifies the construction of the pump.

In FIG. 6 there is shown schematically an overall arrangement of parts for continuously maintaining a predetermined degree of vacuum inside the housing of the pump, of a type such as is shown in FIGS. 1—4. As shown, the pump is operating in a clockwise direction and the flow of fluid is in the direction indicated by the arrows. A vacuum gauge 91 is connected by a tube 92 to the interior of the housing of the pump. Also connected to the tube 92 is another tube 93 which communicates the atmosphere inside the housing to a pressure switch 94. The pressure switch 94 is connected in an electric circuit with a solenoid valve 96 mounted in the inlet line 97 so that upon the pressure in the housing reaching a predetermined maximum, the solenoid 96 is energized to close its associated valve. This temporarily shuts off the flow of fluid to the pump. The tube 32 is connected to the interior of the housing and to the inlet pipe 97 and is provided with a one-way check valve 99 therein. Upon closure of the solenoid valve 96 the check valve 99 permits air inside the housing of the pump to be pumped via tube 32 into the tube 97 and then through the semicircular section of the tube 21 and ultimately out the outlet end of the tube, as indicated at 101. Continued rotation of the driving arm 28 and the rollers 26 and 27 reduces the pressure inside the housing of the pump by this means until the pressure is reduced to a predetermined acceptable level as determined by the setting of the pressure switch 94. When a high enough vacuum has been produced in the housing of the pump, the pressure switch 94 is responsive thereto to actuate the solenoid valve 96 thereby opening the valve in the inlet line 97 permitting the resumption of pumping of fluid.

It is to be understood that the pressure switch 94 can be incorporated directly into the vacuum gauge 91 so that the solenoid 96 is controlled by the position of the pointer of the gauge and switches associated therewith.

A second arrangement for maintaining the vacuum inside the housing of the pump which can be used on either the embodiments shown in FIGS. 1—4 or the embodiment shown in FIG. 5 is schematically illustrated in FIG. 7. In this arrangement a separate vacuum pump 106 is connected via a tube 32' to the interior of the housing of the pump. A pressure switch 108 is likewise connected to the interior of the housing of the pump by a tube 109, the pressure switch being operable to cause engagement of a clutch 111 when the pressure inside the housing reaches a predetermined maximum. The vacuum pump 106 and the pump 20 can be driven from the same motor M. Also, the pump 106 can be mounted inside the housing of pump 20, if desired.

The design shown in FIG. 7 has the advantage over the arrangement shown in FIG. 6 in that it is not necessary to stop the flow of fluid being pumped during the interim period when the vacuum inside the housing is being increased by the auxiliary pump 106.

A third arrangement for maintaining the vacuum inside the housing of the pump, which can be used on the embodiment shown in FIGS. 1—4, is shown in detail in FIGS. 8—10. Essentially, it consists of a separate rotary pump 120 which is driven from the same drive shaft 29 as the main pump 20. The pump 120 includes an arm 121 having a roller 122, the arm being constantly driven by the shaft 29. A flexible tube 123, which can be compressed by the roller 122, sucks air from the inside of the pumps 20 and 120 and exhausts it out a tube 126. However, the tube 123 is mounted on a movable carriage 127 so that the tube 123 is only engaged by the roller 122 when the vacuum in the housing 20 diminishes to a predetermined point.

More particularly, the carriage 127 is supported for sliding movement at its top and bottom on guide rails 128 (FIG. 10). A compression spring 129 urges the carriage 127 to the right (FIG. 9); whereas atmospheric pressure acting on a movable plate 131 urges the carriage 127 (via a shaft 132 and bracket 133) to the left. The plate 131 is provided with a bellows 134 around its periphery so that the differential pressure of the atmosphere and the vacuum in the housing act on opposite sides thereof.

The spring 129 and the plate 131 are designed so that when a sufficiently high vacuum is present in the pumps 20 and 120, a state of equilibrium is achieved wherein the tube 123 is not engaged by the rotating roller 122. When the vacuum diminishes to a predetermined point inside the pumps, the spring 129 (with the help of the added pressure inside the housing acting on plate 131) is adequate to overcome the atmospheric pressure acting on the outside of the plate 131. Accordingly, the carriage moves to the right (FIG. 9) and the roller 122 begins pumping air out of the housing via tube 126. When the vacuum in the housing rises to a predetermined value, the atmospheric pressure acting on plate 131 is sufficient to move the carriage 127 to the left to disengage the roller 122 and the tube 123. The procedure is repeated whenever the vacuum diminishes to an unsatisfactory level.

Referring to FIG. 11 there is shown a schematic diagram of a test apparatus which was actually constructed and operated to evaluate the capabilities of the pump disclosed in FIGS. 1-—4. FIGS. 12 and 13 show the test data which was obtained with the tests which were performed plotting the three variables of revolutions per minute (r.p.m.), gallons per minute (r.p.m.) and the degree of vacuum inside the pump housing. The actual data is plotted in FIG. 13; whereas in FIG. 12 some of the points were obtained by observing the spot at which the curves of FIG. 13 crossed a whole integer on the vertical (vacuum) axis.

It should first be observed that the capacity of the pump was greatly increased as the vacuum inside the housing was increased. For example, it should be noted that at approximately 600 r.p.m. (FIG. 12) the quantity of fluid pumped with 18 inches of vacuum was over twice the quantity of fluid pumped with 3 inches of vacuum. Thus, by simply providing a higher degree of vacuum inside the housing of the pump, it was possible to increase greatly the capacity of the pump without changing any of the other variables in the pumping operation. It should further be observed that it is not possible to obtain a comparable increase in capacity by simply increasing the r.p.m. Noting for example the curve based on 3 inches of vacuum, the output of the pump actually decreased as the r.p.m. were increased from 800 to over 1,000. The reason for the decrease in capacity as the r.p.m. were increased is undoubtedly due to the fact that there was incomplete filling of the diaphragm or tube prior to the commencement of the next revolution of the rollers. If the vacuum is increased, however, it is possible to operate the pump at a higher r.p.m. and still have a substantially complete filling of the tube as illustrated by the curve where 18 inches of vacuum was maintained.

Likewise, referring to FIG. 13, it can be seen that at a fixed r.p.m. the output of the pump is greatly increased by merely increasing the degree of vacuum inside the housing of the pump. This is indicative of the fact that, under normal pumping operations wherein the housing is under atmospheric pressure, the tube or diaphragm does not have sufficient time to completely refill between one pumping cycle and the next. For example, at 1,055 r.p.m. and 3 inches of vacuum the pump output was approximately 3 g.p.m. which is slightly less than the output at 425 r.p.m. with a 3 inch vacuum; whereas when the vacuum inside the housing had been increased to 18 inches of vacuum (at the same 1,055 r.p.m.) the output of the pump had over tripled to 10¾ g.p.m.

The degree of vacuum which must be maintained in the housing has no fixed value. When a resilient diaphragm, which normally assumes a distended configuration, is used, the degree of vacuum is less critical since the diaphragm does not depend entirely on the differential pressure for expansion. However, where a supple diaphragm which normally assumes a flattened shape is used, there must be a high enough vacuum to cause the diaphragm to fill up after each pumping cycle. Likewise, as more capacity is needed, the vacuum must be increased to provide faster and more complete filling of the diaphragm. This also permits the pump to be operated efficiently at higher revolutions per minute since less time is required for refilling the diaphragm.

However, whenever a high vacuum is used, it becomes necessary that the retaining means be employed to constrain the flexible diaphragm and prevent its overexpansion. Also, by using the uniquely shaped tube of the instant invention, much longer tube life can be obtained.

Referring to FIGS. 14—23 there is shown another embodiment of an improved fluid pump of the rotary compress type. In the embodiments discussed heretofore the rollers have been positioned radially inwardly of the tube and have acted outwardly so as to compress the inner tube wall against the outer tube wall. This design has been found to be satisfactory when using tubes which are not too large in diameter and where the inside of the housing has a sufficiently large radius of curvature. By placing the inside of the housing under a substantial vacuum, such as 29 inches of mercury, it is no longer necessary that the walls of the tube be made thick since the restoration of the tube after compression is not dependent upon the natural resiliency in the walls of the tube, but instead is derived from the pressure differential acting on the inside and the outside of the tube. Thus, it has been possible to use rather large inside diameter tubes, for example, two and one-half inches, having a wall thickness of only one-eighth of an inch. A preferred type of tube is a two-ply rubber tube having a reinforcing nylon layer bonded therebetween. In order to obtain improved bonding between the plies, it has been found desirable to roughen the surface of the reinforcing layer.

When using such a large diameter tube it is still desirable, however, to maintain approximately the same overall height of the pump, thus requiring that the radius of curvature of the tube be maintained approximately the same. As should be apparent, when the ratio of the diameter of the tube to the radius of curvature is increased appreciably, the problem of buckling of the inner surface of the tube becomes acute. This follows from the fact that the inner surface of the tube is bent on a smaller radius of curvature than the outer surface thereof. As the diameter of the tube increases it becomes even more difficult to take up the slack created along the radially inner circumference of the tube.

In an attempt to alleviate this problem one can use additional rollers over the required two, such as a total of four or even six rollers, but this has its drawbacks. For example, if six rollers are rotated through one revolution they will pump approximately the same amount of fluid as if two rollers are rotated through one revolution. However, the six rollers use more energy in compressing the tube in an additional four positions; and, likewise, there will be approximately a 200 percent increase in the wear which the rollers impart to the tube. Thus, the solution to the buckling problem provided by the addition of more rollers has been found to be unsatisfactory.

Of course, the diameter of the tube can be reduced and the radius of curvature increased, but by so doing the capacity of the pump is decreased while at the same time the height or size of the pump is increased. Since both of these results are undesirable, these solutions are likewise unacceptable.

Thus, in order to secure the full benefits of a high vacuum in the housing, namely large inside diameter tubes having thin walls and a relatively small radius of curvature, it has been discovered that by placing the rollers on the outside periphery of the rubber tube the aforementioned problems are greatly alleviated. Improved results are also obtained if the deformable tube is molded into the desired radius of curvature so as to alleviate the excessive tube material on the radially inner circumference which is present in previous designs. While molded tubes, per se, are known in the prior art, it is believed that their application in this type of a rotary compress pump is novel. The use of a molded tube alone, however, is not sufficient, and it is essential that the rollers act inwardly on the tube as opposed to outwardly once the ratio of the inside diameter of the tube to the tube wall thickness and the ratio of the inside diameter of the tube to the radius of curvature reach certain specified limits. In actual tests which were performed utilizing a two-ply rubber tube having a nylon reinforced layer therebetween wherein the inside diameter of the tube was 2½ inches and the thickness of the tube was one-eighth inch (20:1) and the radius of curvature was 9 inches (2½:9) it was found that using four rollers with the housing at a vacuum of approximately 29 inches of mercury, the buckling was so acute that the rollers would destroy the tube after approximately five minutes of operation at 300 r.p.m.

The advantages of placing the rollers on the outer radial periphery of the tube are derived from the fact that the outer periphery can be moved inwardly with essentially no elongation of the tube; whereas the inner periphery of the tube can be moved outwardly into engagement with the outer periphery of the tube only by elongating or stretching the tube material (this assumes that a molded tube having essentially no slack on the inner periphery is used). If said tube is not stretchable, such as the case of a woven molded hose, the collapsing of said tube cannot be accomplished. Stated somewhat differently, the inside periphery of the tube lies on the arc of a relatively small circle and must of necessity be expanded or strained in order to move outwardly into engagement with the outer periphery of the tube that lies on the arc of a somewhat larger circle. Such a strain causes destruction of the tube and a loss of efficiency. On the other hand, the outer surface of the tube, which lies on the arc of a somewhat larger circle, may be moved inwardly into engagement with the inner surface of the tube without necessarily any elongation or strain. Furthermore, in the former situation the tube is likely to wrap around and be in contact with a substantially greater portion of the roller than in the latter situation, which is undesirable. The latter arrangement, it is believed, reduces frictional contact between the roller and the tube thereby reducing heat losses and tube wear.

Thus, while it has been known in the prior art to utilize a partial vacuum on the inside of the housing of a rotary compress pump, and while it has also been separately known to place the rollers on the outside periphery of small diameter tubes rather than the inside, nowhere in the prior art has it been recognized that a combination of these two features provides results which are not obtainable when these concepts are utilized independently. If a vacuum alone is utilized and if the roller pushes outwardly instead of inwardly, the buckling problem is immediately encountered when large tubes are compressed on a relatively small radius of curvature. Likewise, if the roller is merely placed on the outside of the tubes pushing inward, without the benefit of a vacuum in the housing, large diameter tubes with thin walls cannot be utilized since the tube must provide resiliency for its restoration. It is only by the combination of these two features that truly high capacity, long endurance, rotary compress pumps can be achieved.

In FIGS. 14, 16, and 19 there is shown in detail this latter embodiment of a fluid pump, denoted generally 200, which includes housing 201. Mounted inside the housing is a tube 202 made of resilient compressible material, as previously described. Tube 202 has an inlet end 203 and an outlet end 204 through which passes the fluid being pumped. The inlet and outlet ends 203 and 204 are bent as shown in FIGS. 17 and 18 into a direction which is generally perpendicular to the plane of the remainder of the tube 202. As will be seen, this is necessary in order to permit the free rotational movement of rollers 206 and 207. As should be apparent, the tube 202 shown in FIGS. 17 and 18 is in its nondeformed configuration. When a roller 206 or 207 acts on the tube 202, the tube assumes the deformed configuration shown in FIG. 16.

The rollers 206 and 207 are mounted on generally J-shaped arms 208 (only one shown) which are fixedly secured to a drive shaft 209 connected to a motor (not shown).

The housing 201 includes a generally flat, circular back plate 211 and a forward section 212 secured thereto by bolts 213'-213'. The arms 208 and the rollers 206 and 207 secured thereto are free to rotate through complete revolutions inside the housing 201. The housing 201 also includes an inner curved supporting wall 213 which is generally circular in configuration and which receives and supports the tube 202. The member 213 also serves as the bearing support for the stub end of the drive shaft 209. Additionally, there are provided round, curved sections 214 and 216 for supporting the inlet and outlet ends 203 and 204, respectively, of the tube 202.

Figure 3:
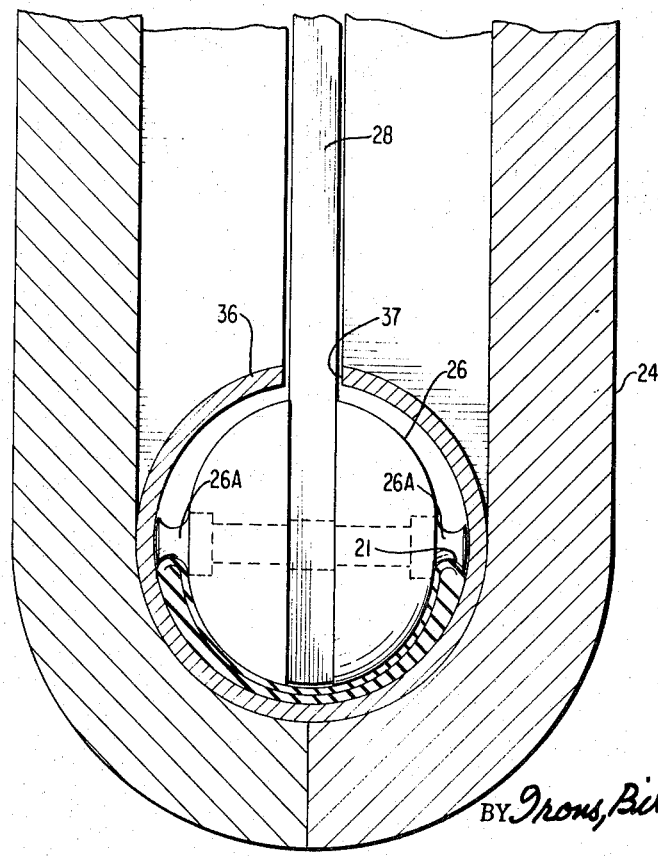
FIG. 3 is an exploded cross-sectional view taken along line 3-3 of FIG. 1 and showing in detail a roller compressing the pumping chamber positioned inside the retainer tube.

As shown in FIG. 15 the tube 202 has generally the same cross-sectional configuration as the tube shown in FIG. 3 except that, since the rollers 206 and 207 are somewhat flatter on their peripheral surface, the tube 202 has a more oblong configuration.

In FIGS. 19–22 there is shown a control device 221 for maintaining a predetermined degree of vacuum within the housing 201. The control device 221 includes a vacuum switch 222 which is electrically connected to a solenoid 223 having an armature 224. The armature 224 is bifurcated, as shown, and functions to position an arcuately shaped actuator 226 which is mounted in a recessed portion 227 of the inner curved wall 213. Overlying the actuator 226 is a small section of hose or tube 228 which is connected at one end on the inside of the housing (FIG. 21), and the other end of which exhausts to atmosphere. As shown in FIG. 20, when the vacuum in the housing 201 reaches a predetermined low point, the armature 224 urges the actuator 226 and the associated tube 228 outwardly from the recess 227 so that the tube 228 is engaged by the rollers 206 and 207 as they pass by. As shown in FIG. 21, the tube 228 is compressed thereby forcing the air which has seeped into the inside of the housing 201 out of the housing to again raise the vacuum within the housing. A suitable check valve 229 (FIG. 22) is provided in the tube 228 to prevent the backward flow of air from the atmosphere into the housing 201. After the vacuum in the housing is raised to a predetermined level, the solenoid 223 is deenergized by the vacuum switch 222 thereby moving the actuator 226 radially inwardly along with the tube 228 so as to move the tube 228 out of engagement with the rollers 206 and 207. It is to be understood that various other auxiliary pumping devices could be utilized to maintain a sufficiently high vacuum inside the housing 201.

In FIG. 23 there is shown another embodiment of a tube 231 which can very advantageously be used in the pump 201. When normal rubber tubes are subjected to the forces present in this type of pump, their useful life is extremely short. In order to obtain longer life, it is common to use two-ply tubes having a reinforced fabric layer, such as nylon, therebetween. The nylon layer preferably is foraminous so that when the tube is molded there are formed rubber connections from one ply to the other through the openings in the fabric. While this is an improvement over single-ply tubes, it is not uncommon for air to become trapped between the plies. When the housing is placed under a high vacuum and pumping is commenced, the tube has a tendency to separate resulting in a rupture. The bonding between the plies can be increased by making the interstices in the fabric layer larger so that the rubber columns bonded therebetween are bigger. However, as the size of the interstices is increased, the tube's ability to withstand high internal pressure is decreased.

Other attempts such a as chemical bonding or increasing the thickness of the rubber or fabric layers have likewise been unsatisfactory. In the latter case, the increase in thickness causes a greater energy loss in flexing, and causes heat losses.

It has been discovered that by roughening the surface of the fabric layer (such as by a napping process) random threads of the fabric can be broken so that they extend generally perpendicular to the plane of the layer. This can be done, for example, by contacting the fabric layer with wire brushes. When the fabric is then bonded between the rubber plies, the loosened filamentary ends of thread are embedded in the rubber forming a mechanical bond therewith. The fabric layer can be woven very closely without the weakening interstices. Furthermore, depending on how the roughening is performed, the finished roughened fabric layer may still be substantially devoid of openings if only individual filaments of the thread are separated in the roughening process.

The tube 231 shown in FIG. 23 represents a modification of the roughened tube described immediately above. In this embodiment there are provided additional strands of thread 232 and 233 which can be looped under either the warp or the woof threads of the fabric, here shown as being under threads 234 and 236, respectively. The ends of the threads 232 and 233 preferably are unraveled to provide a plurality of discrete filaments each of which forms a mechanical bond with the rubber plies. The rubber plies in which the filaments are embedded are denoted 237 and 238.

It should be noted that either the threads 232 or 233 can be omitted depending upon the upon the pressures involved, and that the resulting tube will withstand greater forces than the existing two-ply tubes.

It is to be understood that the invention is not limited to the particular embodiment and features described and shown, but that it comprises any modifications and equivalents within the scope of the appended claims.

I claim

1. A fluid pump, which comprises:
 a hermetically sealed housing having an arcuately shaped inner wall and a high vacuum therein;
 a chamber in the housing formed at least in part by a flexible diaphragm, said diaphragm comprising a tube supported on said inner housing wall and having on its inner surface the pressure of the source of fluid to be pumped and on its exterior surface the pressure of the vacuum within the housing;
 means defining an inlet for fluid to the tube;
 means defining an outlet for fluid from the tube;
 means for collapsing the tube to pump the fluid therein through the outlet so that immediately after the tube is collapsed it returns to its expanded condition ready for another pumping cycle due to the differential pressure on the interior and exterior surfaces thereof, said collapsing means including at least one rotatable arm having a roller on the end thereof for rolling engagement with the tube; and
 retainer means for encompassing the tube to constrain and prevent its overexpansion, said retainer means comprising a rigid tubular member mounted inside the housing and extending substantially from the inlet end to the outlet end of the tube, said member having a slot extending from said inlet end to said outlet end and said arm extending through the slot with the roller on the inside of said member.

2. A pump as recited in claim 1 wherein said tube has inwardly projecting shoulders running along diametric sides of the tube adjacent the plane of maximum bending of the tube while it is collapsed for limiting the angle to which the tube wall is bent and thereby preventing over stressing of the tube material.

3. A pump as recited in claim 2 wherein said roller has extensions on opposed sides said extensions having curved surfaces which are complementary to the shoulders on the tube and which overlap the shoulders during the collapsing of the tube with the collapsed part of the tube lying partially between the extensions and the shoulders to prevent excessive bending thereof.

4. A pump as recited in claim 1 wherein said tube is made of a supple material having a natural tendency to assume a collapsed condition, and wherein said vacuum is of a sufficient degree to cause immediate distention of the tube after each pumping cycle.

5. A pump as recited in claim 1 wherein said tube is made of resilient material and the tube has a natural tendency to assume an expanded condition.

6. A fluid pump, which comprises:
 a pump housing;
 an inlet tube connected to the housing for supplying the fluid to be pumped;
 an outlet tube connected to the housing to receive the fluid being pumped;
 a deformable chamber mounted in the housing and secured between the inlet and outlet tubes;
 means for contracting said chamber to force fluid therein and through the outlet tube;
 means for placing a high degree of vacuum on the exterior surface of said deformable chamber to create a differential pressure on the inside and outside thereof so that the inlet pressure alone is sufficient to rapidly refill the deformable chamber for the next pumping cycle, said vacuum placing means comprising:

a circuit including means for sensing the degree of vacuum in the housing which energizes the circuit upon the vacuum reaching a predetermined low level, a solenoid operated valve position in the inlet tube rendered effective by energization of the circuit for closing the inlet tube to stop the input of fluid to the pump when the predetermined low vacuum level is reached, a bypass line for connecting the inside of the housing to the inlet tube when said valve is closed so that upon continued deformation of said chamber the reduction of pressure thus created inside the deformable chamber is communicated to the housing until a predetermined high level of vacuum is obtained in the housing, whereupon said valve in the inlet tube reopens and pumping of fluid is resumed; and retainer means for encompassing the diaphragm to constrain and prevent its overexpansion.

7. A fluid pump which comprises:
a pump housing;
an inlet tube connected to the housing for supplying the fluid being pumped;
a deformable chamber mounted in the housing and secured between the inlet and outlet tubes;
means for contracting said chamber to force fluid therein and through the outlet tube;
means for placing a high degree of vacuum on the exterior surface of said deformable chamber to create a differential pressure on the inside and outside thereof so that the inlet pressure alone is sufficient to rapidly refill the deformable chamber for the next pumping cycle, said vacuum placing means comprising:
a supplemental pump means for maintaining said high degree of vacuum which include,
a deformable tube having its inlet end positioned in the interior of the pump housing and its outlet end mounted to exhaust air from the housing,
means for depressing said tube along at least part of its length to pump air from the inside to the outside of the pump housing,
a carriage for supporting said deformable tube, said carriage being movable from a first position in which the tube is engaged by said depressing means to a second position where the tube is not engaged by said depressing means, and
means for controlling the position of the carriage so that when the vacuum in the pump housing diminishes to a predetermined degree the depressing means engages the tube in the first position to commence pumping air from the housing, and when the vacuum reaches a predetermined high level the carriage moves the tube to the second position wherein the tube and the depressing means are disengaged; and
retainer means for encompassing the diaphragm to constrain and prevent its overexpansion.

8. A pump as recited in claim 7 wherein said depressing means for said supplemental pump means comprises a rotatable arm having a roller on the end thereof, said arm being driven continuously by said means for contracting said deformable chamber of the fluid pump.

9. A pump as recited in claim 7 wherein said means for controlling the position of said carriage comprises:
at least one guide rail for restraining the carriage to rectilinear motion;
a compression spring connected to the carriage for urging the tube into a position wherein the roller engages the tube to pump air from the pump housing;
a bellows having a plate attached thereto, said plate being exposed on one side to atmospheric pressure, and on the other side to the vacuum on the inside of the pump housing; and
means connecting said plate to the carriage for transmitting the force on the plate to the carriage in a direction opposite to that of the spring so that when the vacuum on the inside of the housing reaches a predetermined high value, the force transmitted to the carriage from the plate is sufficient to overcome the opposite force of the spring, thereby moving the tube into a disengaged position with respect to the roller.

10. In combination with a fluid pump of the type having a housing, and wherein a deformable tube is mounted in the housing having inlet and outlet ends, and including means for collapsing the tube to pump the fluid from the inlet to the outlet end, said collapsing means including at least one roller for rolling engagement with the tube, the improvement which comprises:
said tube has inwardly projecting shoulders running along diametric sides of the tube adjacent the plane of maximum bending of the tube while it is collapsed for limiting the angle to which the tube wall is bent and thereby preventing overstressing of the tube material; and
said roller has extensions on opposed sides, said extensions having curved surfaces which are complementary to the shoulders on the tube and which overlap the shoulders during the collapsing of the tube with the collapsed part of the tube lying partially between the extensions and the shoulders to prevent excessive bending thereof.

11. A fluid pump, which comprises:
a hermetically sealed housing having a curved inner wall;
a deformable tube mounted in the housing on said curved inner wall, said tube having an inlet and an outlet for passage of fluid through said pump;
roller means positioned radially outwardly of said inner wall for pressing said tube inwardly against the inner wall;
means for rotating said roller means around the curved inner wall to deform said tube and force fluid from the inlet to the outlet; and
means for applying at least a partial vacuum to said housing to create a differential pressure on the inside and outside of said tube so that the inlet pressure urges the fluid into the tube after each pumping cycle and expands said tube into its nondeformed configuration.

12. A fluid pump as recited in claim 11, wherein said deformable tube is molded so as to conform generally to the curvature of the inner wall of the housing.

13. A fluid pump as recited in claim 11, wherein said deformable tube has a curvature conforming to an arc of a circle, and wherein said tube extends around the inner wall of the housing in an arc in excess of 180°.

14. A fluid pump as recited in claim 11 wherein said means for rotating said roller means includes at least two J-shaped driving arms having said roller means secured to the ends thereof so that said arms urge the roller means radially inwardly against the housing.

15. A fluid pump as recited in claim 11, which further comprises means for continuously sensing the degree of vacuum inside the housing said vacuum applying means being responsive thereto to maintain the vacuum within a predetermined range.

16. A fluid pump as recited in claim 11, which further comprises:
an auxiliary tube mounted on the inner wall of said housing normally out of engagement with said roller means, said tube having one end terminating inside the housing and the other end exhausting outside the housing;
means responsive to the degree of vacuum in said housing for moving said tube into the path of said roller means to pump the air from the housing; and
a check valve associated with said tube for preventing air from entering the housing from outside the housing.

17. A fluid pump as recited in claim 16, wherein said moving means includes an arcuate-shaped actuator positioned in a recess in said inner wall, said actuator being controlled by a vacuum switch.

18. A fluid pump as recited in claim 11, wherein said deformable tube comprises a two-ply rubber tube having a reinforcing layer of fabric bonded therebetween, said fabric having threads extending outwardly from the surface thereof embedded in said rubber for holding said plies and fabric together.

19. A fluid pump as recited in claim 18 wherein said outwardly extending threads are discrete threads looped under the warp or woof of the reinforcing fabric.

20. A fluid pump as recited in claim 18 wherein said outwardly extending threads are filaments broken from the warp and woof of the reinforcing fabric.